US010811055B1

(12) United States Patent
Kimber et al.

(10) Patent No.: US 10,811,055 B1
(45) Date of Patent: Oct. 20, 2020

(54) METHOD AND SYSTEM FOR REAL TIME SYNCHRONIZATION OF VIDEO PLAYBACK WITH USER MOTION

(71) Applicant: FUJI XEROX CO., LTD., Minato-ku, Tokyo (JP)

(72) Inventors: Donald Kimber, Foster City, CA (US); Laurent Denoue, Veneto (IT); Maribeth Joy Back, Los Gatos, CA (US); Patrick Chiu, Mountain View, CA (US); Chelhwon Kim, Palo Alto, CA (US); Yanxia Zhang, Cupertino, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/455,485

(22) Filed: Jun. 27, 2019

(51) Int. Cl.
| | |
|---|---|
| *H04N 5/932* | (2006.01) |
| *H04N 5/935* | (2006.01) |
| *G11B 27/11* | (2006.01) |
| *G11B 27/34* | (2006.01) |
| *G11B 27/00* | (2006.01) |
| *H04N 5/92* | (2006.01) |

(52) U.S. Cl.
CPC ............ *G11B 27/11* (2013.01); *G11B 27/005* (2013.01); *G11B 27/34* (2013.01)

(58) Field of Classification Search
USPC ................................................. 386/201, 248
See application file for complete search history.

(56) References Cited

U.S. PATENT DOCUMENTS

| | | | | |
|---|---|---|---|---|
| 8,487,871 | B2* | 7/2013 | Langridge | G06F 3/011 345/157 |
| 9,600,717 | B1* | 3/2017 | Dai | G06K 9/6217 |
| 10,304,458 | B1* | 5/2019 | Woo | G10L 15/04 |
| 2010/0195867 | A1* | 8/2010 | Kipman | A63F 13/10 382/103 |
| 2010/0303303 | A1* | 12/2010 | Shen | G06K 9/00335 382/107 |
| 2015/0139505 | A1* | 5/2015 | Vladimirov | G06T 7/246 382/107 |
| 2015/0356840 | A1* | 12/2015 | Wang | G08B 13/19682 382/103 |

(Continued)

OTHER PUBLICATIONS

Kimber, D. et al "Trailblazing: Video Playback Control by Direct Object Manipulation" IEEE International Conference on Multimedia and Expo, Aug. 2007, pp. 1015-1018.

(Continued)

*Primary Examiner* — Nigar Chowdhury
(74) *Attorney, Agent, or Firm* — Procopio, Cory, Hargreaves & Savitch LLP

(57) ABSTRACT

A computer-implemented method is provided for coordinating sensed poses associated with real-time movement of a first object in a live video feed, and pre-recorded poses associated with movement of a second object in a video. The computer-implemented method comprises applying a matching function to determine a match between a point of one of the sensed poses and a corresponding point of the pre-recorded poses, and based on the match, determining a playtime and outputting at least one frame of the video associated with the second object for the playtime.

19 Claims, 6 Drawing Sheets
(3 of 6 Drawing Sheet(s) Filed in Color)

(56) References Cited

U.S. PATENT DOCUMENTS

| | | | | |
|---|---|---|---|---|
| 2016/0012593 | A1* | 1/2016 | Chao | G06K 9/4604 |
| | | | | 382/209 |
| 2016/0059135 | A1* | 3/2016 | Wright | A63F 13/537 |
| | | | | 463/31 |
| 2017/0024921 | A1* | 1/2017 | Beeler | G06T 13/40 |
| 2017/0193334 | A1* | 7/2017 | Krupka | G06K 9/00355 |
| 2017/0256057 | A1* | 9/2017 | Bak | G06T 7/73 |
| 2017/0266491 | A1* | 9/2017 | Rissanen | G06K 9/00342 |
| 2018/0181802 | A1* | 6/2018 | Chen | G06K 9/00201 |
| 2018/0225799 | A1* | 8/2018 | Davis | G06T 7/337 |
| 2019/0188533 | A1* | 6/2019 | Katabi | G06K 9/00369 |
| 2019/0357497 | A1* | 11/2019 | Honchariw | A01K 15/021 |

OTHER PUBLICATIONS

Girgensohn, A. et al. "DOTS: Support for Effective Video Surveillance" Proceedings of the 15th ACM International Conference on Multimedia, 2007, Sep. 23-28, 2006; 10 pages; Augsberg, Bavaria, Germany.

Dragicevic, P. et al. "Video Browsing by Direct Manipulation" In Proceedings of the Twenty-Sixth Annual SIGCHI Conference on Human Factors in Computing Systems, Apr. 5-10, 2008; 10 pages; Florence, Italy.

Clarke, C. et al. "Remote Control by Body Movement in Synchrony with Orbiting Widgets: an Evaluation of TraceMatch" Proceedings of the ACM on Interactive, Mobile, Wearable and Ubiquitous Technologies, Sep. 2017.

Faucett, H. et al. "'I Should Listen More': Real-time Sensing and Feedback of Non-Verbal Communication in Video Telehealth" Proceedings of the ACM on Human-Computer Interaction, Nov. 2017; 19 pages; vol. 1, No. 2, Article 44.

Lee, M. et al. "Empathetic video experience through timely multimodal interaction" International Conference on Multimodal Interfaces and the Workshop on Machine Learning for Multimodal Interaction; Nov. 8-10, 2010 (4 pages).

Alvarado, Irene, "Move Mirror: You move and 80,000 images move with you" Published Jul. 19, 2018; https://www.blog.google/technology/ai/move-mirror-you-move-and-80000-images-move-you; 2 pages.

Baptista, R. et al. "Flexible Feedback System for Posture Monitoring and Correction" IEEE International Conference on Image Information Processing (ICIIP), 2017, pp. 1-6, Shimla, India.

"Procrustes analysis" Wikipedia, retrieved on Jun. 26, 2019;https://en.wikipedia.org/wiki/Procrustes_analysis; 5 pages.

Rhodin, H. et al. "Interactive Motion Mapping for Real-time Character Control" Eurographics, 2014; 10 pages; vol. 33 No. 2.

* cited by examiner

METHOD AND SYSTEM FOR REAL TIME SYNCHRONIZATION OF VIDEO PLAYBACK WITH USER MOTION

BACKGROUND

Field

Aspects of the example implementations relate to methods, systems and user experiences associated with providing video playback that is synchronized, in real time, with user motion, for a user observing the video.

Related Art

In the related art, a user may observe a video that is intended to provide the user with training on performing an activity. For example, a related art video may provide a user with training on a sequence of operations required to perform an assembly of parts of the kit, or for the user to move his or her body in a prescribed manner. Some related art videos may provide training on how the user may move his or her body to perform activities such as yoga, dance, physical therapy, or the like.

Related art video playback approaches can play a sequence of operations, and when a user needs to review a subset of the operations, it is difficult for the user to return to a desired location. For example, a user may need to rewind or scrub a video back to a desired operation.

The related art approaches may have disadvantages or problems. For example, but not by way of limitation, requiring the user to rewind a video back to a desired point can be awkward for the user's training experience, and may detract the attention of the user away from the actual task that the user is trying to learn from the video. Instead of video playback providing training on performing a sequence of tasks, the user is focused on performing the task of controlling the video.

Further, in training activities such as yoga, dance, physical therapy and others, the related art approaches to controlling the video prevent the user from effectively using the related art video playback approaches to perform the learning. As a result of these related art disadvantages, the user is often discouraged from continuing the activity, and may not further advance skills in areas such as yoga or dance, or may actually continue to physically suffer or avoid improvement for video playback associated with physical therapy or the like.

Other related art approaches to controlling video may include voice commands. However, such approaches also have disadvantages and problems. When a user has to use or recall a voice command to rewind or scrub a video back to a desired point, the user loses focus from the training activity, in a manner similar to the related art approach requiring the use of manipulation of a remote control or the like. Related art approaches may also employ gesture related commands, as well as handheld devices. However, such approaches also have problems and disadvantages, in that the user may not be able to perform the training activities, particularly where the activities include positioning of the arms, hands, fingers, etc.

Further related art approaches may include the use of computer generated graphics, such as avatars or animations of avatars, as a substitute for a video playback. However, such related art approaches also have various disadvantages and problems. For example, but not by way of limitation, these related art approaches could have a substantially high development costs. Further, those approaches do not provide photorealism that is desired by a user for training activities.

Thus, there is an unmet need in the related art to be able to track movement of a user, and control and present the playback in an appropriate manner, so as to provide feedback on whether the user is successfully following the training operations provided in the video, without requiring the user to lose focus or discontinue the training activity.

SUMMARY

According to aspects of the example implementations, a computer-implemented method coordinating sensed poses associated with real-time movement of a first object in a live video feed, and pre-recorded poses associated with movement of a second object in a video is provided, the computer-implemented method comprising applying a matching function to determine a match between a point of one of the sensed poses and a corresponding point of the pre-recorded poses; and based on the match, determining a playtime and outputting at least one frame of the video associated with the second object for the playtime.

According to some aspects, the point of one of the sensed poses and the corresponding point of the pre-recorded poses comprises a single point of the first object and the second object in a first mode, and a plurality of points of the first object and the second object in a second mode. Optionally, a user control is provided to select between the first mode and the second mode, and for the second mode, to select a number and a location of the plurality of points of the first object and the second object.

Accordingly to other aspects, the first object comprises a user receiving an output of the video and performing the poses in sequence to coordinate with the pre-recorded poses, and the second object comprises a trainer displayed in the video performing the pre-recorded poses in sequence. Further, wherein the movement may comprise one of: a physical therapy activity, at least a portion of an exercise, at least a portion of a dance, or at least a portion of an acting motion.

According to still other aspects, the computer implemented method includes determining an instantaneous speed estimate over a time window based on a result of the applying the matching function and the determining the playtime; applying a smoothing method to the instantaneous speed estimate, to generate a playspeed; and updating the playtime based on the playspeed. Additionally, the smoothing method may comprise a running average with an empirically determined fixed smoothing factor, or a variable that changes based on a degree of motion of the second object over the time window.

According to yet further aspects, the video comprises one or more visual feedback indicators associated with the pre-recorded poses of the second object. Optionally, the one or more visual feedback indicators may comprise one or more of a trail indicative of a motion path of the corresponding point of the second object, a track that is indicative of a relative speed and a relative direction of the corresponding point of the second object along the trail, and a rubber band indicative of a difference between a position of the corresponding point of the second object and a position of the point of the first object.

Example implementations may also include a non-transitory computer readable medium having a storage and processor, the processor capable of executing instructions for assessing whether a patent has a condition.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
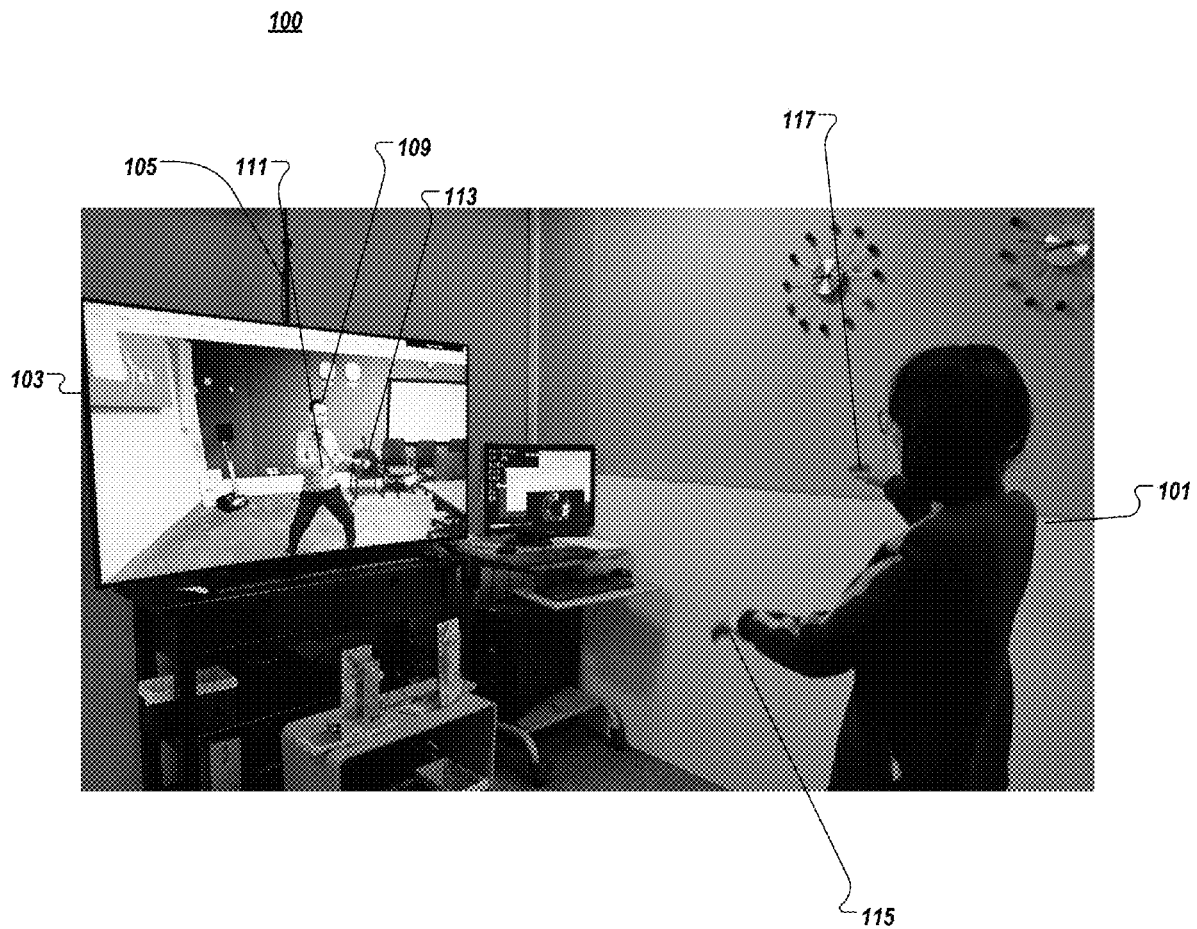
FIG. 1 illustrates various aspects of the system according to an example implementation.

The following detailed description provides further details of the figures and example implementations of the present application. Reference numerals and descriptions of redundant elements between figures are omitted for clarity. Terms used throughout the description are provided as examples and are not intended to be limiting.

Aspects of the example implementations are directed to methods and systems for video playback. More specifically the example implementations include video playback schemes in which the playback of the video is synchronized in real time with the motions and actions of the users that may be watching the video. According to this example implementation, the user may be able to engage in and focus on the physical activities and or tasks associated with the video playback at their selected pace while watching the video, and not needing to lose focus in order to rewind or find a specific point in the video playback. The example implementations may be applied to a variety of videos, including but not limited to physical instruction such as dancing, yoga, Tai Chi or the like, as well as physical therapy, how-to videos and entertainment.

According to these example implementations, the system tracks the movement of the user during the playback in real time, and provides an output to the user that is reactive to the movement, so as to play the video in a manner that matches or coordinates with the physical actions of the user. Thus, the example implementations will provide the user with control over the video playback of the video, which may include, but is not limited to, a recorded expert performance. More specifically, through the motion of the user, the system provides the user with the experience of being in the position of the expert in the video that is being played back. The example implementations are provided without the use of computer-generated graphics or avatars.

In the example implementations, the video playing system tracks movements in the environment. More specifically the movements of the users are tracked in a manner that permits the user to continue to play the video, or to interact with the video in a manner that provides for a useful feedback mechanism, without requiring the user to change focus from the physical activity. For example, but not by way of limitation, the video may include an expert performing a physical activity. In one example implementation, the user may show "cloud hands", a movement in Tai Chi, which a user observing the video is attempting to learn or practice.

FIG. 1 illustrates an example implementation 100. In the example implementation 100, a user 101 is viewing a display 103, such as a video screen, projection screen or the like. One or more video cameras 105 are provided, that sense the user 101. Speakers may also be provided. More specifically, physical activity of the user 101, such as a movement of the body in response to information provided on the display 103, is sensed.

In the display 103, the video playback includes an object 109. In the present example implementation, the object 109 is a prerecorded video of a teacher performing one or more motions. The video playback is synchronized with movements of the user 101. For example, but not by way of limitation, if the user increases the speed of his or her movements, the playback speed of the video is also increased at a corresponding rate. Similarly, if the user 101 slows down, stops, or moves in reverse, the video will correspondingly slow down, stop or move in reverse. As a result, if the user 101 is moving slower than the speed of the object 109 in the video, the video is reactive to the speed difference, and slows down. As a result, the user 109 does not need to rewind or reverse the position of the video playback to a prior point, and the focus of the user 101 is not changed or lost.

Additionally, visual indicators 111, 113 are provided, to give the user 101 feedback about her position, as well as the proper movements, such as the user 101 moving her hands as shown at 115 and 117. For example, but not by way of limitation, in the "cloud hands" examples shown in FIG. 1, as the user 101 moves, the video plays along so that the pose of the object 109 shown in the video keeps time with the movement of the user 101.

To implement the example implementations, the movements of the object 109 in the video are tracked, and the movements of the user 101 in real time are tracked. In the example implementation, a body of a user 101 is being tracked. The tracking provides, at each time, estimates of joint positions, such as 115 and 117, associated with a body of the user 101. However, the example implementations are not limited thereto, and other objects may be substituted for the joint positions of the users without departing from the inventive scope, such as tracking of individuals or objects in the video, and in addition to the object 109 as a body.

The estimates generated in the example implementations will be described in greater detail below. For example, the estimates may be generated in 3-D world space or 2-D image space. Further, the estimates may be generated concurrently with the recording of the video prior to being played back to the user (e.g., live with the initial recording of the video). Further, either as an alternative to the live initial recording estimation, or as an addition thereto, the estimate may be generated after the initial video has been recorded.

Figure 2A:
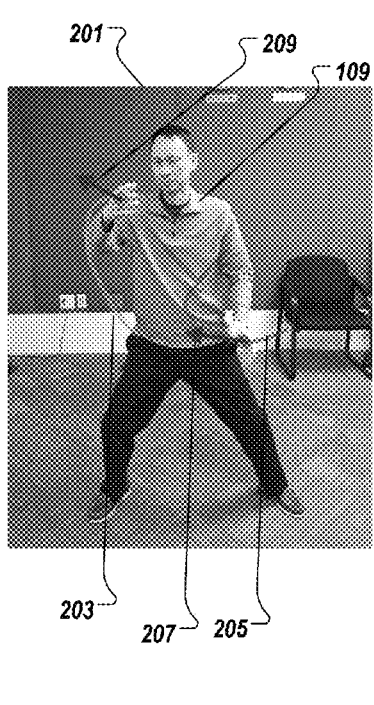
FIGS. 2(a)-2(c) illustrate various aspects of the system according to example implementations.
Figure 2B:
Figure 2C:

FIGS. 2(a)-2(c) illustrate additional example descriptions 200 of visual indicators according to the example implementations. For example, as shown in FIG. 2(a), at 201, the object 109, such as a teacher, in the present example implementation a Tai Chi master, has various indicators illustrated on the display 103 in the video. More specifically, the colored trails 203, 205 show the movement of the hands of the master, as he demonstrates a movement. Arrows 207, 209 are provided, and are indicative of relative speed and direction along the respective trails 203, 205.

As shown in FIG. 2(b), at 211, plural users 101 are being sensed and tracked by the video camera. The signal received from the video camera is being processed to indicate colored trails 213, 215, 221, 223, that are indicative of past and suggested future movement of the hand of the users 101. The arrows 217, 219, 225, 227 are provided to show speed and direction of the movement of the hands of the user 101, along the respective trails.

As shown in FIG. 2(c), the object 109 of the video, in this case the master (e.g., trainer), is illustrated, with the colored trails 231, 233, and the arrows indicative of relative speed and direction along the trails 235, 237. Further, indicators 239, 231, sometimes referred to as "rubber bands" are shown that indicate the relative positions of the hands of the user 101, as shown above in FIG. 2(b), as compared with the matching joints from the recorded video of FIG. 2(a).

With the foregoing example implementations, no additional visual feedback is provided or required for further training of the user, other than the playback of the video itself. Optionally, the above-noted indicators are associated with a degree of matching between the real time movement of the user, as compared with the movement of the corresponding portion in the video. For example, but not by way of limitation, if the synchronization between the user and the prerecorded video is based on a position of one or more joints, or positions on the user's body such as hand positions, the video displayed to the user may illustrate the trails of the hands in the recorded video, along with the indications as to how the user may follow those trails.

Thus, the user may move his or her hands along the trails, at the speed that the user desires, or even in a reverse direction of the trails in the video, and the video, in conjunction with the camera, follows the activity of the user. As also explained above, in addition to the trails themselves, arrows may be provided to indicate a direction and speed of the trail.

Similarly, a user may select various display options with respect to viewing of the video. According to one example implementation, the user may only watch the recorded video and follow (or lead) the recorded video. According to another example implementation, the user may watch the recorded video concurrently with watching their own video in live mode, to be able to view visual feedback of their own movements next to the recorded video. In another example implementation, when a recorded video and live video are shown concurrently as explained herein, movement feedback may be provided in the live video, either in addition to or as a substitute for showing movement feedback in the recorded video.

According to a further example implementation, the movements of the user may be recorded, either as the user is following the video, or moving freely. The recordings of the movements associated with the user may then be used by another user, and/or by a teacher. For example, but not by way of limitation, the example implementation may be used in a distance medicine example implementation.

In such an approach, a physical therapist may record therapeutic movements, such as exercises, for a patient to perform. The patient may watch the video to perform the exercises or movements while being recorded. After the performing of the exercises or movements, the recording may be provided to the physical therapist. The physical therapist may later examine the movements of the patient, and provide additional movements, or feedback on the recorded movements. Further, the physical therapist may use a prerecorded video in comparison to the recorded video of the user, and incorporate the trails, arrows and rubber bands as explained above, to provide detailed instruction and feedback to the user.

While the foregoing example implementations are directed to movements of a body of the user in real time being synchronized with the movements of the body of an object in a video, the example implementations are not limited thereto, and other example implementations may be substituted therefore without departing from the inventive scope. For example, but not by way of limitation, the prerecorded video may include multiple people and tracked objects. Further, during playback, finger positions of the user may be tracked, and may be used to drag the video, based on the movement trails of the finger positions.

Figure 3:
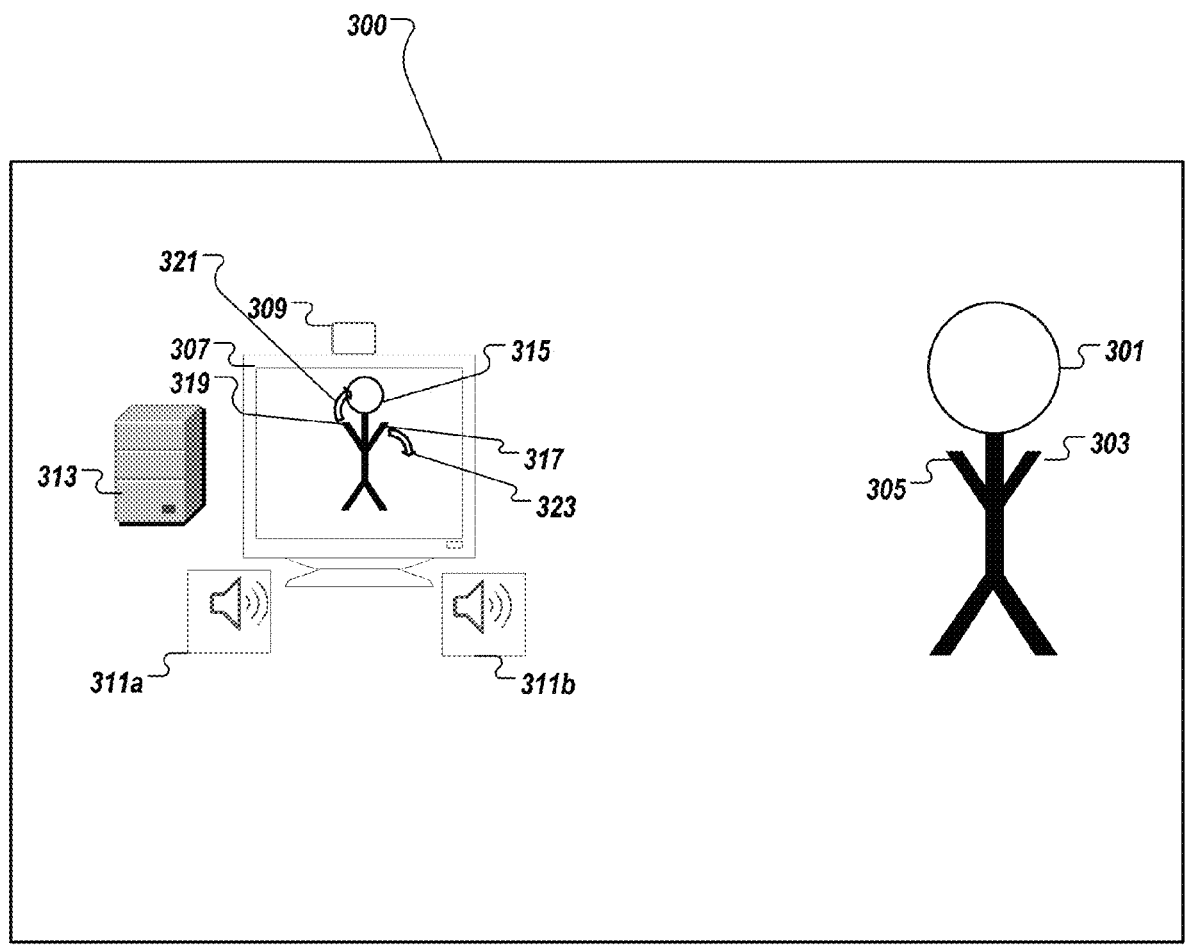
FIG. 3 illustrates example hardware aspects for use in some example implementations.

FIG. 3 illustrates a schematic view of the system according to the example implementations. More specifically, the system is physically located in a region 300, such that a user 301 having joints 303 and 305, may perform a physical activity requiring motion of the one or more joints 303 and 305. The region 300 also includes a display 307, which the user may observe. A playback of the video that was previously recorded is output to the display 307, and includes a sequence of movements or poses that the user 301 is attempting to follow or learn.

A sensor 309, such as a video camera, is provided with the display 307. The sensor 309 may be separate from the display 307, or may be formed integrally with the display 307, such as a camera device built into the display 307. The sensor 309 senses the movements of the user 301, including movements of the joints 303 and 305, which the user is moving based on the output of the prerecorded video on the display 307. Optionally, audio outputs 311a, 311b (e.g., speakers or the like) may also be provided, for example, so that the user may also hear instructions, commands, music, or other audio information associated with the prerecorded video on the display 307.

The display 307, camera 309, and optional audio outputs 311a, 311b may be communicatively coupled, either by wireline or wireless communication, with a processor 313. For example but not by way of limitation, the processor 313 may be a personal computer or laptop that is located in the region 300. Optionally, the processor 313 may be a server that is located remotely from the region 300. The processor 313 may be used to adjust one or more settings associated with the display 307 and/or sensor 309, to adjust, for example but not by way of limitation, matching modes, playback modes, timing modes, speed, trail, arrow, rubber band or other characteristics associated with the output of the display 307 and the input of the sensor 309.

More specifically, the display 307 may include an object 315, such as the prerecorded video of the trainer performing the motions or activities. In the present example implementation, the object 315 is shown having joints 317, 319, and the user 301 is following the movement of the joints 317, 319, and attempting to move his or her joints 303, 305. Further, and as explained above, indicators 321, 323, such as trails, arrows or rubber bands, may also be provided individually or in combination.

As explained above, the example implementations involve performing a matching operation between For a case in which the first sequence of poses and the second sequence of poses are each 2-D image positions of a set of tracked joints, a basic playback mode is provided for each new time step in the sequence, to indicate the frame of the first sequence that is most similar to the frame of the second sequence. To obtain the frame, a matching function is performed. The matching function may be different for different modes or applications. However, according to one example implementation, focus is provided on prescribed joint positions, and other joint positions are ignored. In such an approach, the match would be indicated by a Euclidean distance between image coordinates of the prescribed joint positions. For example, the joint positions may be those associated with the right hand, left hand or other body part.

More specifically, the first sequence may be represented as a sequence $Pv(t)$ of video poses is available for the video, and the second sequence may be represented as live poses $PL(t_c)$, wherein $t_c$ denotes real time clock time, and t denotes playback time in the video. For Pv(t) and PL(t) each being the 2D image positions of a set of tracked joints, the basic playback mode shows for each new time step $t_c$, the frame in recorded video with pose Pv(t) most similar to $PL(t_c)$. For example, the frame is shown for time t*, equation (1) provides the following relationship:

$$t^* = \operatorname*{argmin}_{t} \ match[Pv(t), PL(tc)] \tag{1}$$

where match[.,.] is a matching function. For example, match[Pv(t), $PL(t_c)$] may be the Euclidean distance between image coordinates of the right hand position. If P(t)[j] represents the 2D position of joint j, then for this example implementation, the match function is represented by equation (2) as follows:

$$match[Pv(t),PL(tc)]=dist[Pv(t)[\text{'right hand'}],PL(tc)[\text{'right hand'}]] \tag{2}$$

The example implementations provide one or more matching modes. For example, but not by way of limitation, a single joint point and drag matching mode may be provided, and a multi joint tracking mode may be provided.

According to the single joint point and drag mode of the example implementations, a joint, such as a hand, may be used to select a point that is to be tracked in the video, in the user moves that particular joint to scrub along the trail of the joint in the video. So as to assist the user in making the correct motion without losing focus, a portion of the trail is displayed in the video, and the user may understand where to move his or her hand in real time. According to this single joint point and drag mode, the dragging is engaged when the distance of the hand point to a trail is less than a starting threshold, and the dragging is disengaged when the distance of the hand point to the trail is greater than a stopping threshold.

Alternative approaches may be employed, including but not limited to use of certain gestures or hand movements, such as a closed first and an open first corresponding to a starting and stopping. Thus, the joint of the user is used, in real-time, as a pointer that could also be used to drag objects or joints in the recorded video. Further, the dragged joint is not limited to the joint that is used for the pointer in the video.

According to another example implementation multiple joints may be tracked on a user, and the tracked multiple joints of the user may be matched with corresponding joints in the recorded video. To implement this approach, a match function may be provided, as identified by the relationship in equation (3) as follows:

$$match[Pv(t), PL(tc)] = \sum_{j \ in \ J} dist[Pv(t)[j], PL(tc)[j]]^2 \tag{3}$$

wherein J represents the set of joints being tracked, such as the left-hand as well as the right hand. According to this matching function, a set of joints to be tracked may include as little as a single joint, up to a full set of joints being tracked. While the use of fewer joints may be cognitively easier for a user to maintain focus and understand feedback, as well as to adapt movement to the recording from which they are receiving training, the use of more joints may provide the user with a more holistic characterization of the movement, and thus a more complete training opportunity.

According to one example implementation, a user may be able to control the number of joints being tracked, based on their level of focus or their intention with respect to the training opportunity. For example, but not by way of limitation, a user may, in an early stage of training indicated a selection of one or a few joints, to focus on understanding feedback to adapt fine motor movement to the video recording, and then gradually increase the number of joints in order to be obtain a more holistic training approach.

Further, the example implementations may include one or more playback timing modes. For example, according to a first mode, the prerecorded video provides the basis for the user to follow the movements in the prerecorded video (e.g., related art approach). According to a second mode, the user produces motions, and the video tracks the user. According to a third mode, the user also produces motions, and the video tracks speed.

In the first mode (e.g., related art approach), the prerecorded video is played, such as at a fixed rate. The user, in real time follows the movements of the object in the prerecorded video, and tries to maintain his or her movements with the prerecorded video. The first mode may be represented by equation (4) as follows, for each time step $t_c$:

$$playTime=playTime+playSpeed*\Delta t \tag{4}$$

According to the example implementations in the first mode, the recorded frame is shown for playtime.

According to this example implementation, a user may be presented with user interface elements that permit the user to set or change certain variables. For example, but not by way of limitation, the playtime or the play speed may be modified by the user. In this example implementation, the system does not track the user. However, if the user falls behind the pace of the video and would like to rewind or slow the video down, he or she must explicitly control the video, to revert to the earlier playtime or change the speed.

According to the second mode, the prerecorded video may be paused, and scrubbed to match the motion associated with an aspect of the motion of the user as detected by the system. Accordingly, the playback time is determined by the motions of the user. Further, the continuity of the playback speed is based on the motion of the user. As noted above, for each real time $t_c$, the time of the best matching frame is computed by equation (1) as shown and described above, and the frame from t* is used.

More specifically, for each time step $t_c$, the live frame is observed, and a value of PL(tc) is determined. Further, a value of t* is determined as described above with respect to equation (1). Thus, the playtime is set to t*, and the recorded frame is shown for the playtime.

According to the third mode, the video playback system tracks the motion of the user along the tracks of the video. Based on this tracking, a speed of the motion of the user is estimated. The speed may be positive forward motion on the track, negative or reverse motion on the track, or zero for the user being paused along the track. More specifically, an instantaneous speed estimate is determined over a time window based on a result of the matching function and the determining the playtime. A smoothing method is applied to the instantaneous speed estimate, to generate a playspeed, and the playtime is updated based on the playspeed. Further, the smoothing method may include a running average with an empirically determined fixed smoothing factor, or a variable that changes based on a degree of motion of the second object over the time window.

According to this example implementation, for each time step $t_c$:, the live frame associated with the activity of the user is observed, and PL(tc) is determined. Further, t* is determined according to equation (1), as explained above. Additionally, a value of the s, which is an instantaneous speed estimate, is determined based on equation (5) as follows:

$$s=(t^*-\text{playTime})/\Delta t \quad (5)$$

Based on the determined value of S, the play speed is defined by equation (6) as follows:

$$\text{playSpeed}=w^*s+(1-w)^*\text{playSpeed} \quad (6)$$

In the forgoing equation (6), w is provided as a smoothing weight, which determines how quickly a running estimate of the speed adapts to a new observed speed estimate. For example, a value of 1 for w may effectively eliminate the speed mode aspect. In such a scenario, each time step of the frame for t* would be generated. On the other hand, a value of w that approaches zero would result indicate a more significant degree of smoothing, as the system tracks the speed of the motion of the user.

Accordingly, the play speed is used to determine the playtime, as shown in equation (7) below:

$$\text{playTime}=\text{playTime}+\text{playSpeed}^*\Delta t \quad (7)$$

Based on the foregoing, the recorded frame is shown for playtime.

In the foregoing example implementation associated with the third mode, the value of w is associated with a strength of a change in a user's detected position, in terms of its effect on the updated play speed estimate. For example, but not by way of limitation, w may be a fixed value that is determined empirically. Alternatively, w may be determined in another manner that is not a constant, but may be associated with how quickly the trails in the recording change with respect to time. For example, speed may be defined in the pose space of the recorded trail motion at time t according to equation (8):

$$v(t)=\text{dist}[Pv(t),Pv(t+\Delta t)]/\Delta t \quad (8)$$

A larger value of v(t) is indicative of a more significant amount of motion. The detected position change provides an estimate of a time change, and thus, w may be indicated to be higher. On the other hand, a smaller value of v(t) may indicate that for a period of time, there is little motion. In such a situation, the estimate of speech should not be updated when there is little motion, and the value of w may be maintained close to zero, such that the video continues to play at the same speed until a later time in the recording, when motion resumes.

Where a trail interacts with itself, or where "flickering" is generated near intersection points, where slight perturbation of tracked positions may cause discontinuity in video playback, successive frames may be presented from significantly different recording times. To address this occurrence, a term may be added to the match score in a manner that penalizes differences in time from the current playtime. Further, the synchronized playback mode may be provided where the system maintains continuity, but adapts play speed to follow the user. Additionally, tracking of additional joints may be added. In a circumstance where a period of time exists in the recording, and there is no apparent motion of joints being tracked, the third mode as explained above may be used with a motion dependent update rate, as also described above.

According to some example implementations, a user may position himself or herself, such that the positions of his or her joints in the video images may be used to control the system. For example, but not by way of limitation, the user may stand in a pose where his or her joints are positioned proximal to the joints in a video that the user may wish to control or be associated with.

Alternatively, a transform may be applied from the tracked joint positions to a registered position that is approximately aligned with the joints in the video. For example, but not by way of limitation, the tracked joints may be translated by a translation function T that aligns head positions, centers of masses, joint points or the like. The registration may be performed at the start of use, and updated as explicitly requested, or on a periodic basis, such as with each frame. For the updates occurring frequently, the update weights may be set for a low amount of motion over a time period, so that the relative timescale that is associated with the registration is slower than the timescale of the motions that are typical of the activity associated with the training.

For 3-D positions, the registration may implement Procrustes fitting, in order to obtain a least-squares alignment of points with respect to transformations of translation, rotation and optionally, scale. Additional registration approaches may employ methods for motion adaptation between skeletal models. By using the 3-D example implementations, there may be benefits for advantages. For example, but not by way of limitation, when the user is performing motions that involve moving backwards and forwards with respect to the position of the camera, the joint tracking may be substantially more effective at detecting and processing such movements with precision and accuracy, as compared with the 2-D example implementations.

According to an example implementation, the system may automatically recognize when a user is switching between one exercise and another exercise, for example. In one example implementation, a motion that is being performed live may be used as a query against a library of information, such as historical data, and the system may automatically learn or predict an activity using the matching function.

Additionally, the user activity that is being sensed by the system may be recorded, and provided to a trainer or, for example, physical therapist. Thus, the activity of the user may be recorded, fed through a tracker and converted to recorded content, and provided to a trainer, for comparison to the prerecorded video using the matching function.

Figure 4:
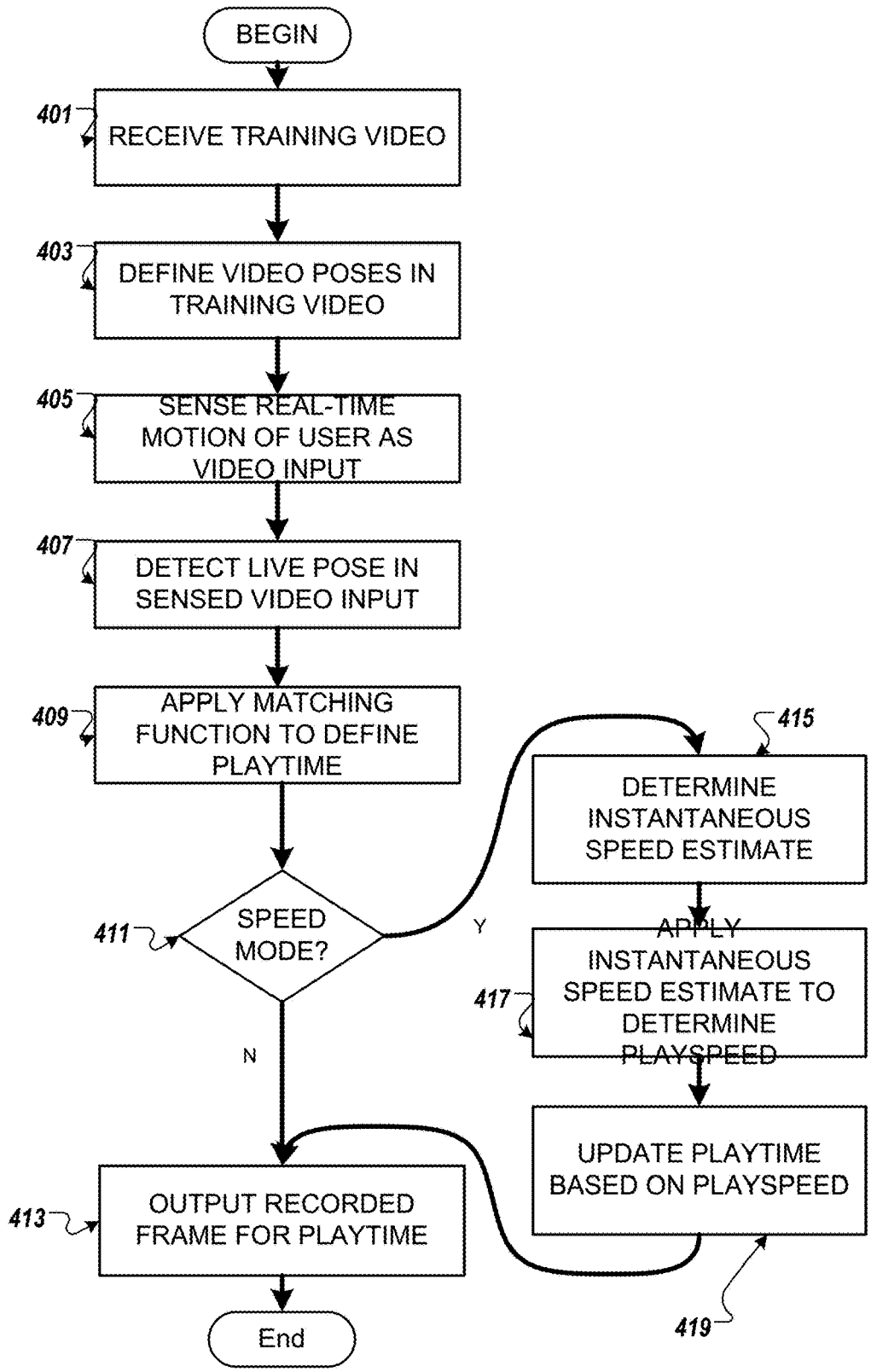
FIG. 4 illustrates an example process for some example implementations.

FIG. 4 illustrates an example process 400 according to the example implementations. The example process 400 may be performed on one or more devices, as explained herein.

At 401, a playback video or training video is received. For example, but not by way of limitation, the training video may be a recording of the trainer performing the motions. The training video will be displayed on the display for the user during the training.

At 403, the training video is processed so as to define a sequence of video poses in the training video. This processing may be performed in real time as the video is being recorded. Alternatively, the video poses may be captured after the training video has been recorded, such as during off-line processing of the video. As explained above, the poses are associated with tracking of one or more joints.

Accordingly, after 403, the training video has been generated. The training video may be used by one or more users that are in the process of training on the motions being performed in the content of the video. Operations 401 and 403 only need to be performed at the first point when the video is being generated, and need not be performed each time the user views the video.

At 405, a user performs motions that are sensed by a sensor. For example, but not by way of limitation, the sensor may be a camera that senses the real time movements of the user as a video input. Depending on the playback timing modes, the user may be performing the motions concurrently with the playback of the video, with the video leading and the user following. Alternatively, the user may be leading, and the video may be tracking the user, as explained herein.

At 407, also in real time, from the sensed video input, live tracking is performed. As a result of the live tracking, one or more live poses of the user is detected in the sensed video input, in real-time.

Once the one or more live poses of the user is detected in the sensed video input in real time, and as explained above, the video poses of the training video have been previously defined, a matching function may be applied at 409. Aspects of the matching function are described above. As the result of the matching function, a playtime (e.g., t*) is defined for the frame. Accordingly, the playing of the prerecorded playback video can be determined in terms of playtime based on the pose of the tracked joint. As noted above, the matching mode may include a single joint point and drag, multi-joint tracking, or a combination thereof. In the present example implementations, an argmin function is used as explained above. However, other functions may be substituted therefore as would be understood by those skilled in the art.

At 411, an assessment is made as to whether the playback timing mode is a mode in which the video playback system tracks the motion of the user along with the tracks of the video, and estimates the speed of that motion (e.g., "speed mode"). If the playback timing mode is in "speed mode", then operations 415-419 are performed, as explained below. If the playback timing mode is not in "speed mode", then operation 413 is performed.

For the playback timing mode not being in "speed mode", at 413, the recorded frame of the training video is output for the playtime as defined in operation 409. Then, the operation continuously precedes, as the user continues to change his or her pose.

For the playback timing mode being in "speed mode", at 415, an instantaneous speed estimate is determined, as explained above.

At 417, the determined instantaneous speed estimate is applied to a smoothing weight w, as explained above, to determine a playspeed. Optionally, and as explained above, the value of w may be determined empirically, or based on a relationship between how quickly the trails in the recording video change over time (e.g., v(t)).

At 419, the playtime is updated to add the play speed multiplied by the time interval, and then, operation 413 is performed, as explained above.

Figure 5:
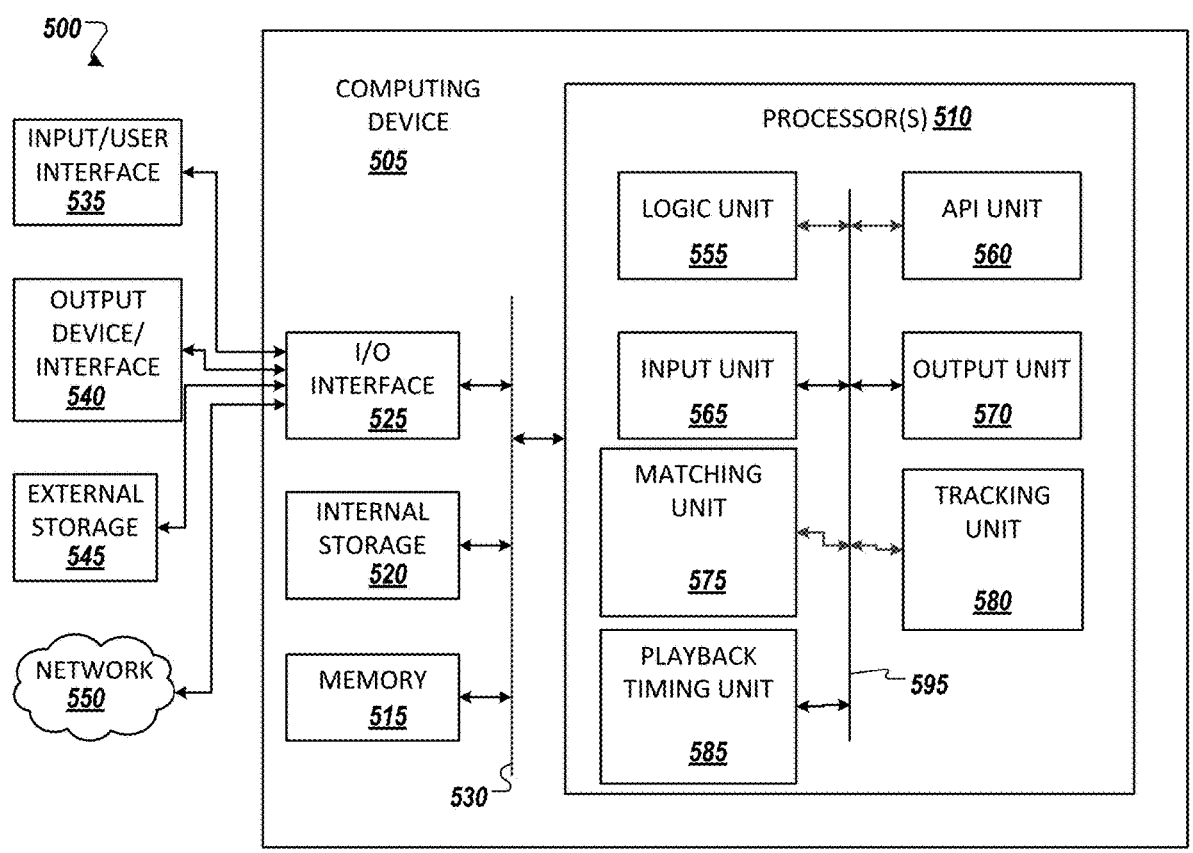
FIG. 5 illustrates an example computing environment with an example computer device suitable for use in some example implementations.

FIG. 5 illustrates an example computing environment 500 with an example computer device 505 suitable for use in some example implementations. Computing device 505 in computing environment 500 can include one or more processing units, cores, or processors 510, memory 515 (e.g., RAM, ROM, and/or the like), internal storage 520 (e.g., magnetic, optical, solid state storage, and/or organic), and/or I/O interface 525, any of which can be coupled on a communication mechanism or bus 530 for communicating information or embedded in the computing device 505.

Computing device 505 can be communicatively coupled to input/interface 535 and output device/interface 540. Either one or both of input/interface 535 and output device/interface 540 can be a wired or wireless interface and can be detachable. Input/interface 535 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 540 may include a display, television, monitor, printer, speaker, braille, or the like. In some example implementations, input/interface 535 (e.g., user interface) and output device/interface 540 can be embedded with, or physically coupled to, the computing device 505. In other example implementations, other computing devices may function as, or provide the functions of, an input/interface 535 and output device/interface 540 for a computing device 505.

Examples of computing device 505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 505 can be communicatively coupled (e.g., via I/O interface 525) to external storage 545 and network 550 for communicating with any number of networked components, devices, and systems, including one or more computing devices of the same or different configuration. Computing device 505 or any connected computing device can be functioning as, providing services of, or referred to as, a server, client, thin server, general machine, special-purpose machine, or another label. For example but not by way of limitation, network 550 may include the blockchain network, and/or the cloud.

I/O interface 525 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 500. Network 550 can be any network or combination of networks (e.g., the Internet, local area network, wide area network, a telephonic network, a cellular network, satellite network, and the like).

Computing device 505 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 510 can execute under any operating system (OS) (not shown), in a native or virtual environment. One or more applications can be deployed that include logic unit 555, application programming interface (API) unit 560, input unit 565, output unit 570, matching unit 575, tracking unit 580, playback timing unit 585, and inter-unit communication mechanism 595 for the different units to communicate with each other, with the OS, and with other applications (not shown).

For example, the matching unit 575, the tracking unit 580, and the playback timing unit 585 may implement one or more processes shown above with respect to the structures described above. The described units and elements can be varied in design, function, configuration, or implementation and are not limited to the descriptions provided.

In some example implementations, when information or an execution instruction is received by API unit 560, it may be communicated to one or more other units (e.g., logic unit 555, input unit 565, matching unit 575, tracking unit 580, and playback timing unit 585).

For example, the matching unit 575 may receive and process information associated with the prerecorded playback video having the captured video poses, as well as the real time live video feed to detect a pose. An output of the matching unit may provide a value that is indicative of a time t* associated with the comparison of the tracked joints between the prerecorded playback video and the live pose of the user. An output of the matching unit 575 may be used, for example to determine the playtime, which is in turn used to determine how long the recorded frame should be displayed. Similarly, the tracking unit 580 may be provided to perform the function of tracking of the speed of the motion of the user along the tracks of the video, as explained above. Additionally, the playback timing unit 585 may perform the playback, based on the information obtained from the matching unit 575 and the tracking unit 580.

In some instances, the logic unit 555 may be configured to control the information flow among the units and direct the services provided by API unit 560, input unit 565, matching unit 575, tracking unit 580, and playback timing unit 585 in some example implementations described above. For example, the flow of one or more processes or implementations may be controlled by logic unit 555 alone or in conjunction with API unit 860.

Figure 6:
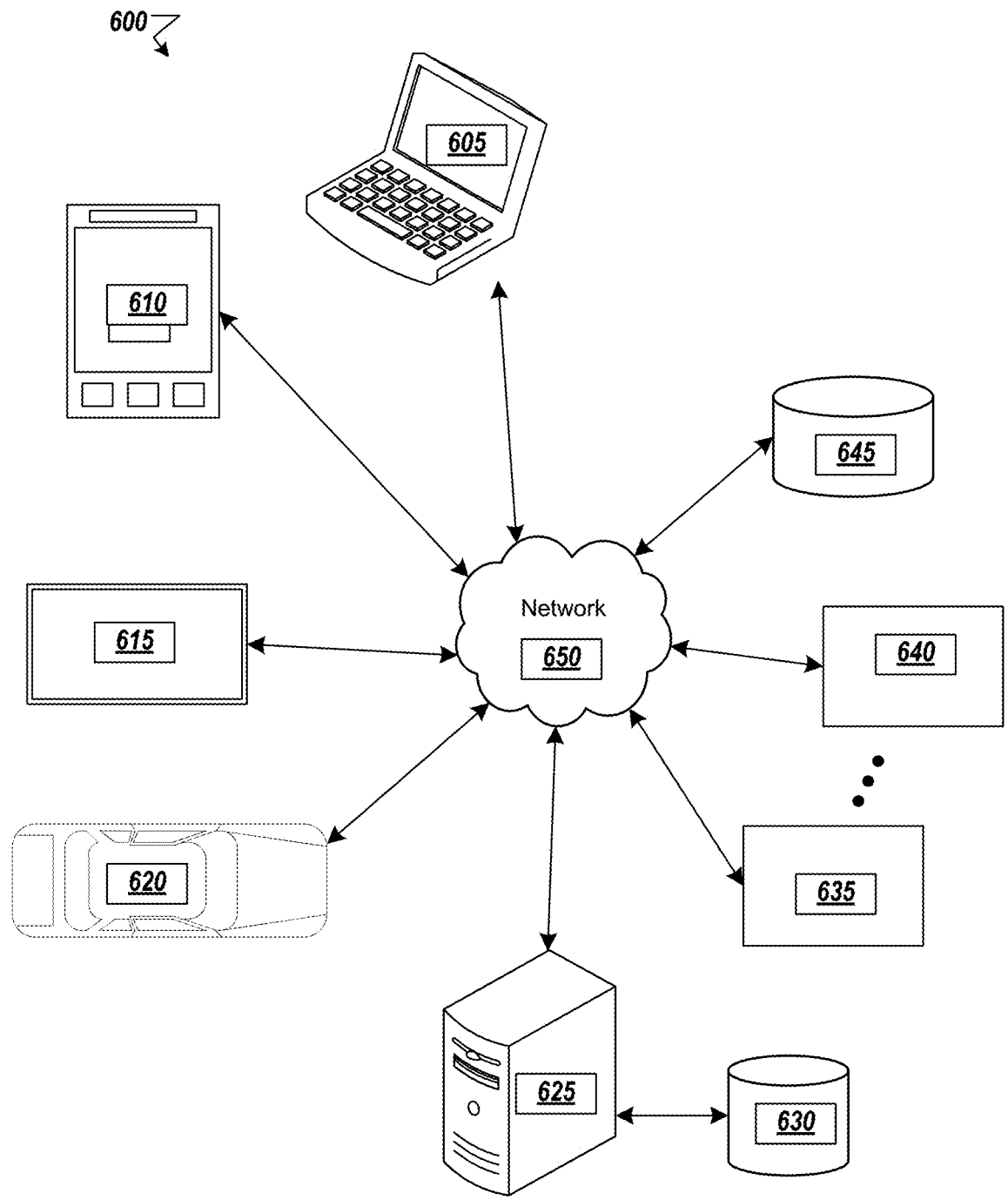
FIG. 6 shows an example environment suitable for some example implementations.

FIG. 6 shows an example environment suitable for some example implementations. Environment 600 includes devices 605-645, and each is communicatively connected to at least one other device via, for example, network 660 (e.g., by wired and/or wireless connections). Some devices may be communicatively connected to one or more storage devices 630 and 645.

An example of one or more devices 605-645 may be computing devices 505 described in FIG. 5, respectively. Devices 605-645 may include, but are not limited to, a computer 605 (e.g., a laptop computing device) having a monitor and an associated webcam as explained above, a mobile device 610 (e.g., smartphone or tablet), a television 615, a device associated with a vehicle 620, a server computer 625, computing devices 635-640, storage devices 630 and 645.

In some implementations, devices 605-620 may be considered user devices associated with the users, who may be remotely receiving a display of the training session in various locations. Devices 625-645 may be devices associated with service providers (e.g., used to store and process information associated with the operation of the display device, the sensing device and the settings associated with the matching modes and the playback timing modes). In the present example implementations, one or more of these user devices may be associated with sensors position proximal to the user, to be able to sense the real time motions of the user and provide the real time live video feed to the system for processing of the poses based on tracking of the one or more joints of the user, as explained above.

The example implementations may have various benefits and advantages. For example, but not by way of limitation, the present example implementations do not require a user to hold an object, such as a remote control or a mouse, which can modify the movements of the user's body, or cause the user to become defocused from the training process. Instead, the example implementations track the body movements of the user, so that the user can maintain focus of the training activity.

Additionally, according to the example implementations, multi-joint tracking is provided. As explained above, a user may select a number of joints to be tracked, depending on the intention of the user (e.g., a user focusing on only a motion of a single joint, or focusing on learning a single activity associated with a single trail, as compared with a user focused on learning a series of motions as part of a more holistic training).

Further, the example implementations provide for a plurality of playback modes that may be interactively determined, either by the system itself or manually. For example, by not by way of limitation, the example implementations not only provide a mode in which a user leads and a video follows, but also provides a mode in which the video leads and the user follows, as well as mutual synchronization modes. In contrast, related art approaches do not provide synchronization of the video with the user as explained herein with respect to the example implementations.

Additionally, according to the example implementations, there is no requirement for predefining events that the user has to perform in order to advance to further parts of the training. Instead, the example implementations, by the motion analysis schemes described herein, provide for matching of poses from a prerecorded video with respect to the live movements of the body of the user and the user's motion, such that the user can experience moves from the video, without having to predefine actions.

According to various aspects of the example implementations, simulation training, where a user is performing a set of poses or motions in real time, in comparison to a prescribed set of training poses or motions, can be used without requiring the user to use any device for tracking joint location for the existence of poses.

According to another example implementation, the aspects described herein may be applied for entertainment activities. For example, a video of a famous person acting or dancing may be the playback video, and the user may be a student of acting or entertainment, intending to learn the technique of that particular individual actor. By applying the trails, arrows and/or rubber bands, the actor may learn to control the fine motor movement of the joints being tracked so as to be able to emulate the style or techniques of the famous person. Further, as the actor becomes more skilled in specific motions, the multi joint function may be applied, so as to permit the user to be able to learn additional motions, and to eventually be able to learn the entire body movement and motions of the famous person. Because the speed of the prerecorded video is based on the movement of the user, the actor can practice certain motions, styles or techniques without losing focus and having to rewind or go back to a prescribed point in the video, as in the related art approaches.

Additionally, there may be other aspects and example implementations associated with the present inventive concept. For example, but not by way of limitation, a query mechanism may be provided, such that for a desired sequence of poses, a search may be performed to find similar available online videos. In this example implementation, the real time live video of the user is replaced with prerecorded online video segments that are compared, using the matching function, to the prerecorded video to determine similarity and matching for the joint motion.

Further, in circumstances where the user is performing one or more motions, and the one or more motions performing by the user include the plurality of poses, a query may be performed on the motions of the user, to determine a most proximal set of pre-recorded videos. The most relevant results of the query they then be classified, and the user may be informed as to how his or her motions appeared to be similar to the most relevant class. For example, but not by way of limitation, a user may be attempting to perform a certain type of dance. However, the motions of the user may be more similar to another type of dance, which is different from the type of dance in the prerecorded training video. The user may be informed that the dance that he or she is performing is a different dance, and may be offered an option of performing training on the different dance, as opposed to the dance in the prerecorded training video.

Similarly, a user performing a certain type of exercise or physical therapy may be provided with an indication that the most relevant joint motions associated with the user are actually different from the one in the prerecorded video. In such a situation, the user may be recommended to try the type of exercise for physical therapy that showed the highest relevance the query, instead of the certain type of exercise for physical therapy that was selected by the user.

As an additional aspect of the example implementations, and as explained above, the "speed mode" may provide an indication that the user has paused activity, or the motions have started to slow down. The pausing or slowing down may be an indication that the user is becoming fatigued or losing interest in the activity, or experiencing pain, such as in the case of physical therapy. Thus, the results of the "speed mode" may be used as an indicator to recommend that the user consider taking a break, try another activity, or restart the prerecorded video, for example.

Optionally, the numerical values associated with the matching function may be used to generate a similarity score between the movements of the user and the prerecorded video. Such scores may be used to determine, amongst the plurality of users that are engaging in motions as compared to a common prerecorded video, which one of the users has the closest match to the prerecorded video. For example, in a competition to determine which of the users most closely emulates a prescribed set of motions associated with a sport, dancing, acting etc., a user having a higher score may be determined based on the numerical values associated with the matching function.

According to still other example implementations, aspects may be integrated into an augmented reality or virtual reality scenario. For example, but not by way of limitation, for forensics and identification of individuals, the body movements of an individual shown in a security camera recording may be compared to real time live video feed of the same location, to determine a frequency of an individual having a gait and body movement being present. Further, including the use of 3-D cameras may permit a user in an augmented reality or virtual reality scenario to be able to make body movements in an appropriate manner for that scenario.

In the foregoing example implementations, various terms are used to describe aspects and features. However, the example implementations are not limited thereto, and other terms and descriptions may be substituted therefor, without departing from the inventive scope. For example, but not by way of limitation, the computer-implemented method includes coordinating of sensed poses and pre-recorded poses. The sensed poses may be sensed by a 2-D or 3-D video camera as explained above. Further, the sensed poses may be associated with the real-time movement of a first object (e.g., user being sensed by a video camera, but not limited thereto) in a live video feed. The pre-recorded poses may be associated with the movement of a second object (e.g., trainer in a video). However, the first object need not be a user, and the second object need not be a trainer.

Further, the computer-implemented method includes applying a matching function to determine a match between a point of one of the sensed poses and a corresponding point of the pre-recorded poses, and based on the match, determining a playtime and outputting at least one frame of the video associated with the second object for the playtime. In some example implementations, the point of one of the sensed poses and the corresponding point of the pre-recorded poses may be a joint or plural joints of the user (e.g., hand, foot, etc.). Additionally, the matching function to be applied may include those explained above, as well as others that may be substituted therefor, as would be understood by those skilled in the art.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method of coordinating sensed poses associated with real-time movement of a first object in a live video feed and pre-recorded poses associated with movement of a second object in a video, the computer-implemented method comprising:
    applying a matching function to determine a match between a point of one of the sensed poses and a corresponding point of the pre-recorded poses;
    based on the match, determining a playtime and outputting at least one frame of the video associated with the second object for the playtime;
    determining an instantaneous speed estimate over a time window based on a result of the applying the matching function and the determining the playtime;
    applying a smoothing method to the instantaneous speed estimate, to generate a playspeed; and
    updating the playtime based on the playspeed.

2. The computer implemented method of claim 1, wherein the point of one of the sensed poses and the corresponding point of the pre-recorded poses comprises a single point of the first object and the second object in a first mode, and a plurality of points of the first object and the second object in a second mode.

3. The computer implemented method of claim 2, wherein a user control is provided to select between the first mode and the second mode, and for the second mode, to select a number and a location of the plurality of points of the first object and the second object.

4. The computer implemented method of claim 1, wherein the first object comprises a user receiving an output of the video and performing the poses in sequence to coordinate with the pre-recorded poses, and the second object comprises a trainer displayed in the video performing the pre-recorded poses in sequence.

5. The computer implemented method of claim 4, wherein the movement comprises one of: a physical therapy activity, at least a portion of an exercise, at least a portion of a dance, or at least a portion of an acting motion.

6. The computer implemented method of claim 1, wherein the smoothing method comprises a running average with an empirically determined smoothing factor, or a variable that changes based on a degree of motion of the second object over the time window.

7. The computer implemented method of claim 1, wherein the video comprises one or more visual feedback indicators associated with the pre-recorded poses of the second object.

8. The computer implemented method of claim 7, wherein the one or more visual feedback indicators comprises one or more of a trail indicative of a motion path of the corresponding point of the second object, a track that is indicative of a relative speed and a relative direction of the corresponding point of the second object along the trail, and a rubber band indicative of a difference between a position of the corresponding point of the second object and a position of the point of the first object.

9. A system capable of coordinating sensed poses associated with real-time movement of a first object in a live video feed and pre-recorded poses associated with movement of a second object in a video, the system configured to perform the operations of:
   applying a matching function to determine a match between a point of one of the sensed poses and a corresponding point of the pre-recorded poses;
   based on the match, determining a playtime and outputting at least one frame of the video associated with the second object for the playtime;
   determining an instantaneous speed estimate over a time window based on a result of the applying the matching function and the determining the playtime;
   applying a smoothing method to the instantaneous speed estimate, to generate a playspeed; and
   updating the playtime based on the playspeed.

10. The system of claim 9, wherein the point of one of the sensed poses and the corresponding point of the pre-recorded poses comprises a single point of the first object and the second object in a first mode, and a plurality of points of the first object and the second object in a second mode, wherein a user control is provided to select between the first mode and the second mode, and for the second mode, to select a number and a location of the plurality of points of the first object and the second object.

11. The system of claim 9, wherein the first object comprises a user receiving an output of the video and performing the poses in sequence to coordinate with the pre-recorded poses, and the second object comprises a trainer displayed in the video performing the pre-recorded poses in sequence, wherein the movement comprises one of: a physical therapy activity, at least a portion of an exercise, at least a portion of a dance, or at least a portion of an acting motion.

12. The system of claim 9, wherein the smoothing factor comprises an empirically determined fixed value, or a variable that changes based on a degree of motion of the second object over the time window.

13. The system of claim 9, wherein the video includes one or more visual feedback indicators associated with the pre-recorded poses of the second object, wherein the one or more visual feedback indicators comprises one or more of a trail indicative of a motion path of the corresponding point of the second object, a track that is indicative of a relative speed and a relative direction of the corresponding point of the second object along the trail, and a rubber band indicative of a difference between a position of the corresponding point of the second object and a position of the point of the first object.

14. A non-transitory computer readable medium having a storage that stores instructions for coordinating sensed poses associated with real-time movement of a first object in a live video feed and pre-recorded poses associated with movement of a second object in a video, the instructions executed by a processor, the instructions comprising:
   applying a matching function to determine a match between a point of one of the sensed poses and a corresponding point of the pre-recorded poses;
   based on the match, determining a playtime and outputting at least one frame of the video associated with the second object for the playtime;
   determining an instantaneous speed estimate over a time window based on a result of the applying the matching function and the determining the playtime;
   applying a smoothing method to the instantaneous speed estimate, to generate a playspeed; and
   updating the playtime based on the playspeed.

15. The non-transitory computer readable medium of claim 14, wherein the point of one of the sensed poses and the corresponding point of the pre-recorded poses comprises a single point of the first object and the second object in a first mode, and a plurality of points of the first object and the second object in a second mode, wherein a user control is provided to select between the first mode and the second mode, and for the second mode, to select a number and a location of the plurality of points of the first object and the second object.

16. The non-transitory computer readable medium of claim 14, wherein the first object comprises a user receiving an output of the video and performing the poses in sequence to coordinate with the pre-recorded poses, and the second object comprises a trainer displayed in the video performing the pre-recorded poses in sequence, wherein the movement comprises one of: a physical therapy activity, at least a portion of an exercise, at least a portion of a dance, or at least a portion of an acting motion.

17. The non-transitory computer readable medium of claim 14, wherein the smoothing factor comprises an empirically determined fixed value, or a variable that changes based on a degree of motion of the second object over the time window.

18. The non-transitory computer readable medium of claim 14, wherein the video comprises one or more visual feedback indicators associated with the pre-recorded poses of the second object.

19. The non-transitory computer readable medium of claim 18, wherein the one or more visual feedback indicators comprises one or more of a trail indicative of a motion path of the corresponding point of the second object, a track that is indicative of a relative speed and a relative direction of the corresponding point of the second object along the trail, and a rubber band indicative of a difference between a position of the corresponding point of the second object and a position of the point of the first object.

* * * * *